(12) United States Patent
Meyer

(10) Patent No.: US 6,882,334 B1
(45) Date of Patent: Apr. 19, 2005

(54) APPARATUS AND METHOD FOR DETECTION OF COMMUNICATION SIGNAL LOSS

(75) Inventor: Corwyn R. Meyer, Sioux Falls, SD (US)

(73) Assignee: Gateway, Inc., Irvine, CA (US)

( * ) Notice: Subject to any disclaimer, the term of this patent is extended or adjusted under 35 U.S.C. 154(b) by 0 days.

(21) Appl. No.: 09/460,962

(22) Filed: Dec. 14, 1999

(51) Int. Cl.$^7$ .............................................. G09G 5/00
(52) U.S. Cl. .................. 345/156; 345/169; 340/825.36
(58) Field of Search ................... 345/156, 168, 345/169, 158; 341/20–22, 27; 340/31, 328, 384.2, 384.5, 825.36, 7.58, 7.6, 539, 384.1; 455/556, 557, 566, 95, 67.1; 710/15

(56) References Cited

U.S. PATENT DOCUMENTS

| 4,014,016 A | | 3/1977 | Sherritt et al. .............. 340/384 |
| 4,087,638 A | | 5/1978 | Hayes et al. ................ 179/2 E |
| 4,334,280 A | | 6/1982 | McDonald .................. 364/710 |
| 4,412,210 A | | 10/1983 | Washizuka et al. .......... 340/365 |
| 5,034,598 A | | 7/1991 | Poland ....................... 235/435 |
| 5,467,341 A | * | 11/1995 | Matsukane et al. ......... 370/253 |
| 5,565,782 A | | 10/1996 | Sato ........................... 324/435 |
| 5,579,238 A | | 11/1996 | Krugman .................... 364/508 |
| 5,585,792 A | | 12/1996 | Liu et al. ....................... 341/22 |
| 5,610,601 A | | 3/1997 | Lahti et al. .................... 341/22 |
| 5,793,359 A | | 8/1998 | Ushikubo .................... 345/169 |
| 5,794,014 A | | 8/1998 | Shetty et al. ................ 395/500 |
| 5,801,696 A | | 9/1998 | Roberts ....................... 345/340 |
| 5,805,067 A | * | 9/1998 | Bradley et al. ............. 340/635 |
| 5,826,008 A | | 10/1998 | Bluvband ................. 395/185.1 |
| 5,856,795 A | | 1/1999 | Arnold et al. ................. 341/26 |
| 5,862,395 A | | 1/1999 | Bier ....................... 395/800.01 |
| 5,877,745 A | | 3/1999 | Beeteson et al. ........... 345/153 |
| 5,878,248 A | | 3/1999 | Tehranian et al. .......... 395/502 |
| 5,881,366 A | | 3/1999 | Bodemann et al. ............ 455/66 |
| 5,990,868 A | * | 11/1999 | Frederick ..................... 345/158 |
| 6,011,806 A | * | 1/2000 | Herring ....................... 370/494 |
| 6,032,040 A | * | 2/2000 | Choy et al. .................. 455/414 |
| 6,131,130 A | * | 10/2000 | Van Ryzin ...................... 710/6 |
| 6,252,501 B1 | * | 6/2001 | Tice et al. ................... 340/506 |
| 6,343,071 B1 | * | 1/2002 | Lansford ..................... 370/338 |
| 6,470,179 B1 | * | 10/2002 | Chow et al. ................. 455/406 |

FOREIGN PATENT DOCUMENTS

| JP | 09319476 A | * | 12/1997 | ............. G06F/3/00 |
| JP | 10149248 A | * | 6/1998 | ........... G06F/3/023 |
| JP | 411095900 A | * | 4/1999 | ............. G06F/3/02 |

* cited by examiner

*Primary Examiner*—Regina Liang
(74) *Attorney, Agent, or Firm*—Jeffrey A. Prochi; Ross F. Hunt, Jr.; Stites & Harbison PLLC

(57) ABSTRACT

A system and method for notifying a user of a loss of wireless communication between a host device and at least one peripheral device is described. The system comprises a host device, at least one peripheral device, means for detecting a loss of wireless connection between the host device and the at least one peripheral device and an alarm notifying the user of the loss of wireless connection between the host device and the at least one peripheral device. A method for notifying a user of a loss of wireless communication between a host device and at least one peripheral device is described, the method comprising detecting a loss of wireless communication between a host device and at least one peripheral device, signaling software controlling a transceiver that the loss of communication has been detected and transmitting a message to alert the user of the loss of wireless communication.

22 Claims, 5 Drawing Sheets

APPARATUS AND METHOD FOR DETECTION OF COMMUNICATION SIGNAL LOSS

FIELD OF THE INVENTION

The present invention relates generally to wireless communication for electronic devices, and more particularly to an apparatus and method for detection of a loss of a wireless communication signal.

BACKGROUND OF THE INVENTION

It has become more and more common to have a computer based home entertainment system, integrating a computer with other home entertainment products such as a VCR, audio devices, computer peripherals, and the like. Integrated personal computer and television systems are known in the art as a "convergence environment" in which a personal computer (PC) is integrated with other devices and capabilities, such as and usually including at least television (TV) capability. Such hardware components are known and available in the art. An example is the Gateway Destination PC/TV system, available from Gateway, Inc., known as the Gateway Destination System.

Peripheral computer devices attached to a computer may include, for example, and not by way of limitation, a mouse or other pointing device, printers, scanners, modems, keyboards, joysticks and game pads, and virtual reality devices such as gloves and visors. These devices are typically physically connected to the computer central processing unit (CPU) box via cables and the like. As such, mobility and range of the devices is somewhat limited. Although longer cables may be attached to the devices, for each device attached, a cord is used.

Many peripheral devices such as keyboards, mice, joysticks and the like have recently been equipped with wireless communication links to the main computer. Such wireless links include radio frequency (RF) links and infrared (IR) links. Other links may be viable, such as optical and the like. However, due to the movement nature of many such peripherals, a wireless link is often difficult to maintain, since movement may interrupt the wireless link, especially in the case of an infrared link.

Still, peripheral devices to date only communicate via one way communication. For example, a signal is transmitted from a peripheral such as a keyboard to a host such as a PC with no interaction back to the keyboard. Present technology uses one way communications and simply assumes that the communications channel is functioning and that the data typed into the keyboard is received by the PC. No feedback is given to the user when the communications link is broken.

An IR protocol called TWIRP has been developed by SolutionNet which allows two way IR communication. Some wireless keyboard manufacturers have added this protocol to some versions of their keyboards. No known RF keyboards currently use two way communication.

If communication is lost, the only way to find out is to look at the screen and see that there is an error in the connection. This is not fast enough, and often there are too many errors and the catch up time is beyond the capacity of the peripheral. The peripheral may have a small buffer and the number of characters or signals exceeds buffer size. This causes frustration of the user if characters or signals are dropped due to an unstable communications link.

SUMMARY OF THE INVENTION

The present invention overcomes problems of the prior art by providing a system and method to communicate to a user when the communication between the peripheral and the host is compromised. Accordingly, in one embodiment the present invention provides bi-directional communication between a host and at least one peripheral. The present invention also provides bi-directional communications between a host and two or more peripherals, while permitting the host to identify the origin of a signal.

In another embodiment, an audible signal is provided to catch the attention of a user who is not looking at the screen. The audible signal alerts the user to an absence of a signal, i.e. that the communication between the peripheral and the host has been broken. An audible alarm will be of utility for any user who is not deaf to alert the user to an absence of a signal. In an alternative embodiment, a vibrating signal is provided to alert a hearing impaired user.

DESCRIPTION OF EMBODIMENTS

In the following detailed description of sample embodiments, reference is made to the accompanying drawings which form a part hereof, and which are shown by way of illustration specific embodiments in which the invention may be practiced. These embodiments are described in sufficient detail to enable those skilled in the art to practice the invention, and it is to be understood that other embodiments may be utilized and logical, structural, electrical, and other changes may be made without departing from the scope of the present invention.

The present invention provides in one embodiment an improved communications system/method between a host system and one or more connected peripherals which alerts a user to a break in the communication between the host and a peripheral. In one embodiment, the system transmits audible feedback to a user if the communication between a peripheral and host is broken. The various embodiments of the present invention are designed for low range (typically less than 20 meters) IR or RF communication between a host and a peripheral. The system/method includes means for providing bi-directional communications between a host and at least one peripheral. At the same time, a method is provided to permit a host to identify the origin of a signal, i.e. to distinguish between peripherals which communicate with the host. The host may be a PC, a convergence system such as the Gateway Destination System, or the like.

In one embodiment, the present invention provides transmission of an audible feedback to a user when communication between a wireless keyboard and a PC is broken. Two technologies commonly used for wireless keyboards are IR and RF. Most technologies in use provide one way communication. A signal is transmitted from the keyboard to the PC with no interaction or return signal back to the keyboard. SolutionNet has developed an IR protocol called TWIRP which supports two way IR communication. While some wireless keyboard manufacturers have added this protocol to certain versions of their keyboards, no use for two way communication has been identified. This technology would have the capability of implementing two way communication and could be used to accomplish two way communication between a PC and a keyboard in accordance with the present invention. No known RF keyboards use two way communications.

Figure 1:
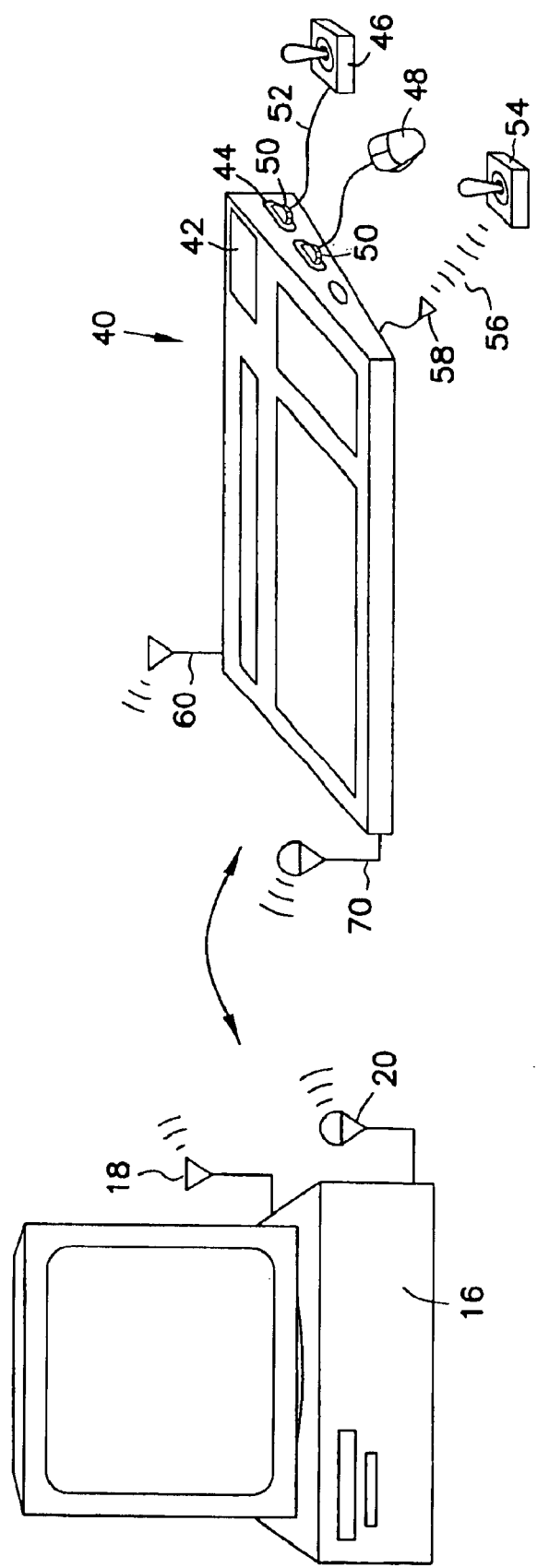
FIG. 1 is a perspective view of an embodiment of the present invention.
Figure 2:
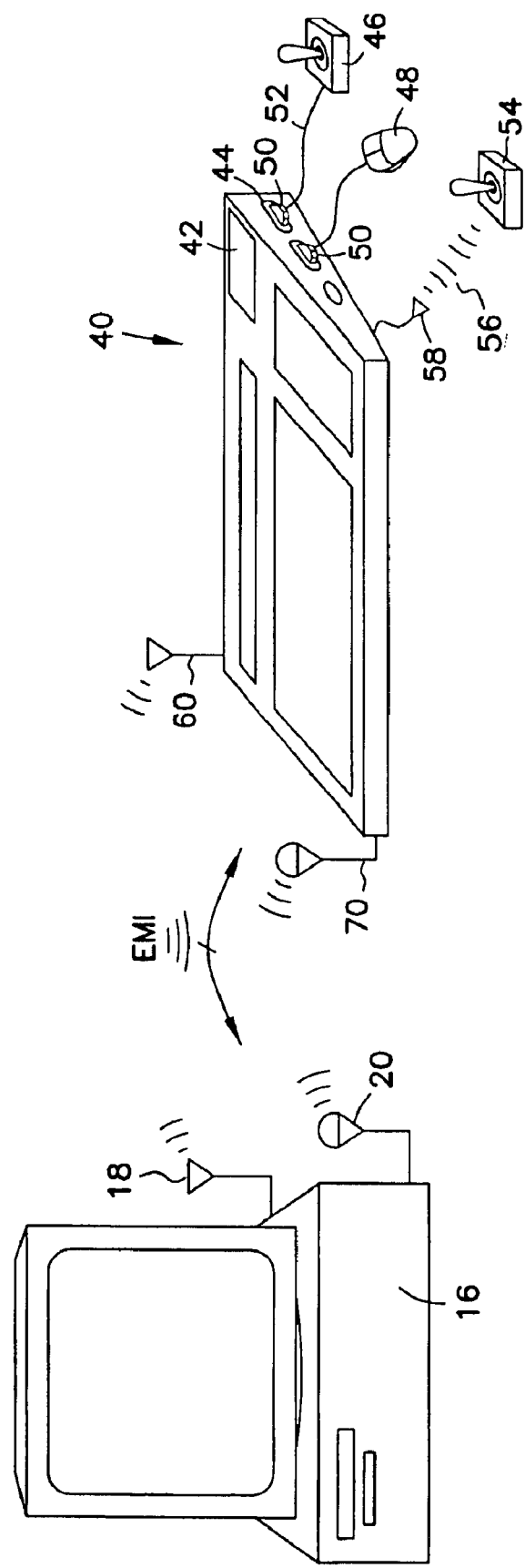
FIG. 2 is a perspective view as in FIG. 1.

The present invention provides in one embodiment a system and method for warning a wireless keyboard user if the communications channel between the wireless keyboard and the computer has been broken, i.e. if the communication ceases or is affected by an outside source. Keyboard users are normally looking at another document or data as they type. They assume that the information they are typing is being correctly transmitted to the computer. Referring to FIGS. 1 and 2, the present invention utilizes two way communication between a wireless keyboard 40 and a computer 16 and provides verification that the information being typed into the keyboard 40 is being received by the computer 16. Keyboard 40 communicates with host computer 16 via a wireless link. The transmission media for the wireless keyboard can be either RF or IR, however other wireless communication protocols could also be utilized. A radio frequency transceiver 60 and an IR transceiver 70 are shown as alternative wireless communications means for keyboard 40. The wireless receiver connected to the computer 16 can be either RF or IR. A radio frequency transceiver 18 and an IR transceiver 20 are shown as alternative wireless communications means for computer 16.

While multiple peripherals may communicate separately with the host, the present invention in one embodiment incorporates an input device with an integrated communications protocol hub through which multiple peripherals may communicate with the host. An input device with an integrated communications protocol hub is shown in U.S. patent application Ser. No. 09/386,556, incorporated herein by reference. As shown in FIGS. 1 and 2, keyboard 40 may include an integrated communications protocol hub and a plurality of peripheral device connector slots 44. Connector slots 44 facilitate the connection of peripheral devices such as a joystick 46 and mouse 48 to keyboard 40 with standard connector plugs 50 and cabling 52. The connector slots may be Universal Serial Bus (USB), serial or parallel, IEEE-48, RS-232, Centronics parallel, gameport I/F and the like. Alternatively, peripheral devices may communicate with keyboard 40 via wireless communication link, as exemplified by joystick 54 which has a wireless communication link 56 to keyboard 40 via transceiver 58.

Each time a key is pressed, the wireless keyboard 40 transmits to the computer a packet of information or electromagnetic signal that contains the keystroke information each time a key is pressed. This information packet is received by the wireless receiver 18 or 20 connected to the computer 16. The wireless receiver 18, 20, transmits a response back to the wireless keyboard 40 confirming the reception and content of the information and then transfers the information to the computer 16. If no return information is received at the keyboard from the wireless receiver 18 or 20, the wireless keyboard 40 will retransmit the original packet of information and wait for a response back from the wireless receiver 18 or 20. The peripheral may exchange regularly scheduled tokens back and forth with the host, or alternatively, protocols which exchange data or regulate the bus to make sure the connection is viable may be utilized. The wireless keyboard 40 will beep or emit a predetermined or preselected noise if no response is received from the wireless receiver 18 or 20 after a predetermined number of attempts at packet transmission by the wireless keyboard 40.

The present invention provides, in one embodiment, audible feedback to a user when the communication link between the peripheral such as a wireless keyboard 40 and the host, such as a computer 16 or convergence system, is broken, as shown at FIG. 2. This will alert the user that data is missing and that the user must correct the situation before continuing to type information into the keyboard 40. This will increase the robustness of wireless keyboard communication links and decrease the frustration level that can result from broken wireless keyboard communication links.

When confirmation of the computer's receipt of communication from the keyboard is not received, the keyboard 40 or other peripheral computer device emits in one embodiment an audible alarm. The audible alarm alerts the user when communication ceases or is affected by an outside source. The interruption in communication could be caused by anything that affects IR or RF signals. For example the distance between the peripheral and the computer system could be too great. Alternatively, an outside source could affect the signal. RF communication set up from a lighting booth at too large a distance could affect the signal. As shown at FIG. 2, electromagnetic interference could affect the signal. In addition, fluorescent light, a vacuum cleaner or power tools could impact the signal. If IR is utilized, a high particulate concentration in the air, such as caused by smoke, fog could impact the signal. The IR standard currently fills a room with the IR signal, but IR could still be affected by smoke or fog. Further, a loss of signal may simply be caused by weak or dead batteries in the transmission device.

The audible signal is important to catch the attention of a user not looking at the screen. An audible alarm would be of utility for any user who is not deaf to alert the user to an absence of a signal. Alternatively, a vibrating alarm either attached to or in communication with the keyboard or peripheral may be used for a user who is hearing impaired.

The alarm in one embodiment chirps at the user or vibrates to alert the user when a distance limitation is reached, or the peripheral device needs to be reoriented to reestablish communication with the host.

In one embodiment, the present invention comprises a method of alerting a user when wireless communication between a host device and a peripheral is broken or compromised. The method comprises establishing a wireless connection between one or more peripherals, such as a keyboard, joysticks, game pads, a mouse and the like, to a host device, such as a PC. The wireless connection between the peripheral(s) and the host may be a direct link. Alternatively, the peripheral(s) may be attached to a single input device having an integrated universal serial bus hub which is linked to a host by a wireless connection. The method further comprises detection of a loss of communication between the individual peripheral(s) or the single input device to which the peripheral(s) are connected, and generation of a signal (such as an audible sound or a vibration) to alert a user of the loss of communication. As such, the individual peripheral(s) or the single input device to which the peripheral(s) are connected detects when the communication with the host device is compromised, and generates an alarm signal in response thereto. The alarm signal may be audible, and further may be a vibrating signal.

The method of the present invention in one embodiment may comprise computer programs written to perform the methods on a personal computer 16 as shown in FIGS. 1 and 2. The computer programs run on the central processing unit 16 out of main memory, and may be transferred to the main memory from permanent storage via disk drive when stored on removable media or via a network connection or modem connection when stored outside of the personal computer, or via other types of computer or machine readable medium from which it can be read and utilized. The computer programs comprise multiple modules or objects to perform the method. The type of computer programming languages used to write the code may vary between procedural code-type languages to object oriented languages. The files or objects need not have a one to one correspondence to the modules or method steps described depending on the desires of the programmer. Further, the method and apparatus may comprise combinations of software, hardware and firmware as is well known to those skilled in the art.

Figure 3:
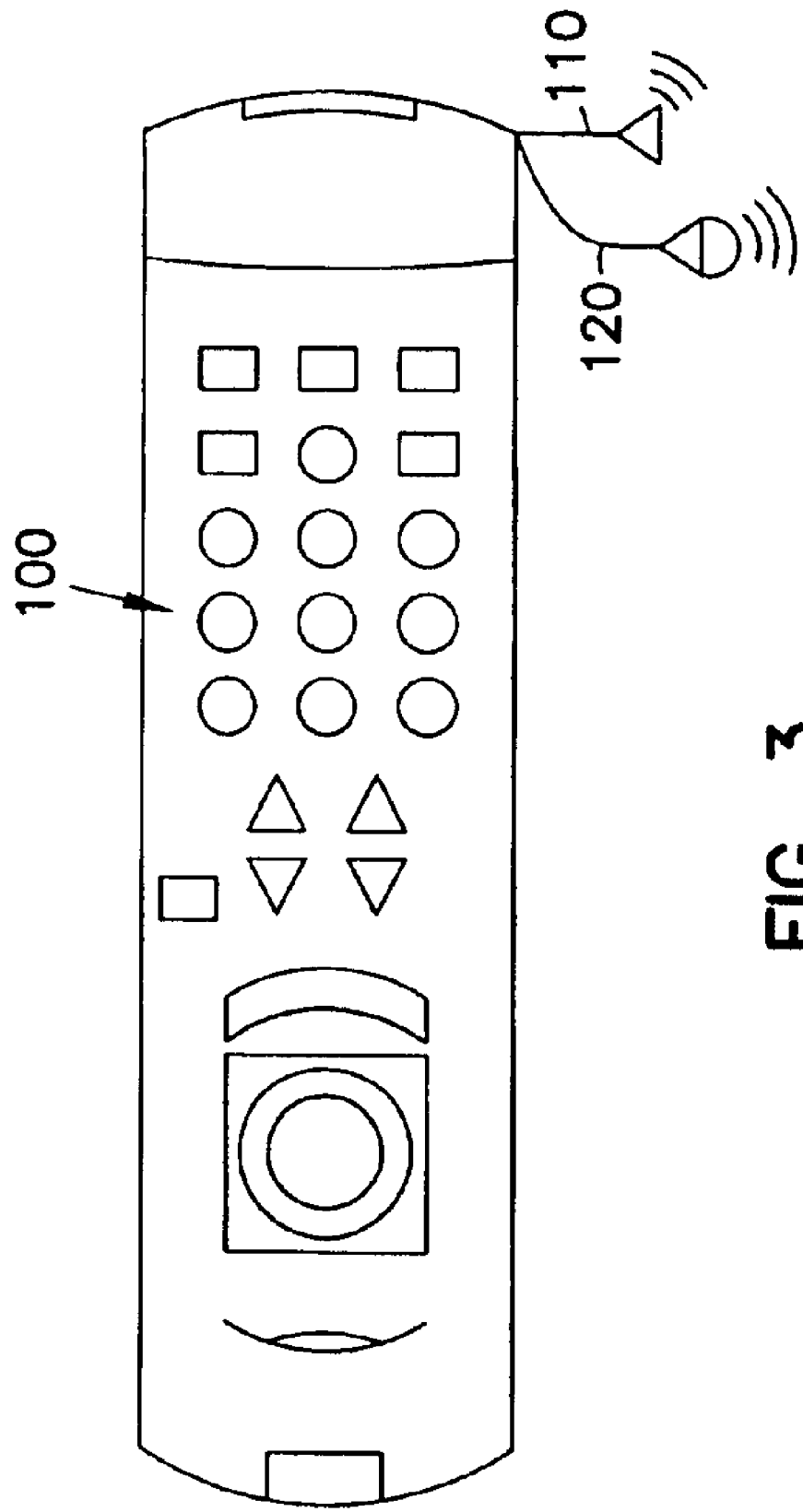
FIG. 3 is a top plan view of an embodiment of the present invention.

In one embodiment shown in FIG. 3, the present invention comprises a remote control device including an audible alarm or a vibrating alarm. FIG. 3 shows a hand held device 100 with a RF transmitter 110 or an IR transmitter 120. The device 100 may be a remote control device for example, for facilitating Power Point presentations. When communication between the remote control 100 and a host computer is lost, the remote control device will emit an audible alarm such as a chirp, or will vibrate. This will occur, for example in the absence of a directed IR beam.

The alarm may comprise simple tones, to provide simple signaling. For example, a Morse Code like system of beeps could be utilized requiring only an inexpensive buzzer instead of an electric speaker. One dot/beep could be associated with one device, two dots/beeps could be associated with a second device, etc. Alternatively, different tones could be assigned to different devices.

The tones could be unobtrusive, for situations where the user is there to hear them. Alternatively, the tones could be unobtrusive at first, and become progressively louder as time passes and the communication is still cut off. For example, a computer controlled lighting system for a band concert or presentation would have a communication monitoring system according to the present invention continuously running in background. The system could comprise a digital communication system with a token passing automatically, for example, every 100 milliseconds.

Where multiple peripherals are connected to a system, different tones or patterns of vibration may be emitted depending on which system or which remote piece is being communicated with. For example, a different tone or pulse would be emitted for each of a PC, TV, DVD player, or stereo. For example, when communicating via remote control with the convergence system, but not the DVD player, specific tones or an audio file stating "lost link with DVD player" may be provided. In addition, an IR blaster controlling a large number of devices from lamps to consumer electronics (CE) devices to Nintendo games, i.e. any device which works on a wireless basis, may be incorporated into a system according to the present invention. Where there are multiple devices, multiple alarm signals specific to each device are important.

Further, when a device has both IR and RF capabilities, the tone or signal may identify which communication link has broken down. With IR, the first course to remedy the communication problem will be to reposition the peripheral. With RF, it may be necessary to look for EMI sources or blocking sources. A tone specific to IR or RF communication in one embodiment assists in identifying the peripheral.

When a fully programmable remote is used, MIDI (Musical Instrument Digital Interface) files associated with each application could be programmed into it. For example, if the DVD communication is compromised, the remote would play a MIDI file indicating as such. Where the convergence system communicates with one device which is the only target in convergence system, only one tone would be required.

Utilizing MIDI files, specific messages may be utilized to alert the user to a communication problem in a specific device. The remote would be programmed to identify 1) the type of communication, i.e. IR or RF; 2) the type of device, i.e. host PC, consumer electronics devices (CEs), general communications hubs (IR system for running a home network, IR transceiver), and the like; and 3) list a message, i.e. "communication lost" or "communication intermittent" with a specific audio file for each device.

TABLE 1

| TYPE | DEVICE | MIDI MESSAGE |
|---|---|---|
| IR | HOST PC | COMMUNICATION LOST |
| RF | CE(n) GC HUBS | COMMUNICATION INTERMITTENT |

By using these three lists shown at Table 1, three MIDIs can be run in succession to establish a protocol for alerting the user to a communication problem associated with each component of the user's system. It should be understood that additional MIDI messages could be utilized without departing from the scope of the invention.

Figure 4:
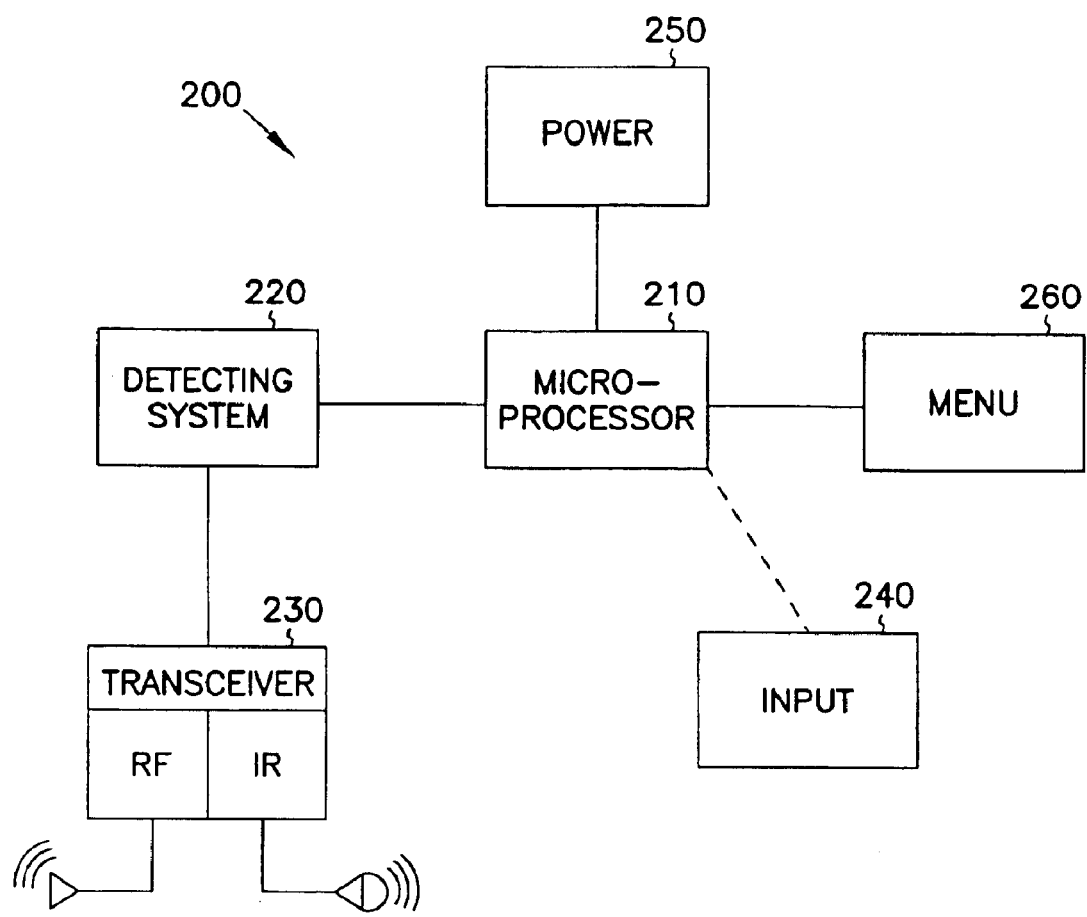
FIG. 4 is a block diagram showing the major components of an embodiment of the present invention.

As such, in this embodiment, the most simple alarm comprises a beep, and the most complicated is a verbal MIDI file putting together a string of MIDI recordings informing the user exactly what is happening. Referring to FIG. 4, a MIDI system 200 according to one embodiment of the present invention is shown. A microprocessor 210 is used to hold or store all MIDIs. The system can be run by software, hardware, firmware, or a combination thereof. A detecting system 220 is associated with a transceiver 230 for detecting RF or IR communication. Transceiver 230 in various embodiments includes an RF transceiver, an IR transceiver, or both. The device generally has an input device 240 such as the keys of a keyboard. Alternatively, the device may be a transponder, such as a piece of jewelry which indicates the user's position and for example, turns on the TV when the user approaches. The system has a power switch 250 and a menu 260 with different codes for controlling different devices and protocols. The system may comprise a remote control device such as a TV remote. The system may alternatively comprise a detecting program for use in a Palm Pilot or like host device, which brings up graphical user interfaces (GUIs) for different IR or RF devices associated therewith.

Figure 5:
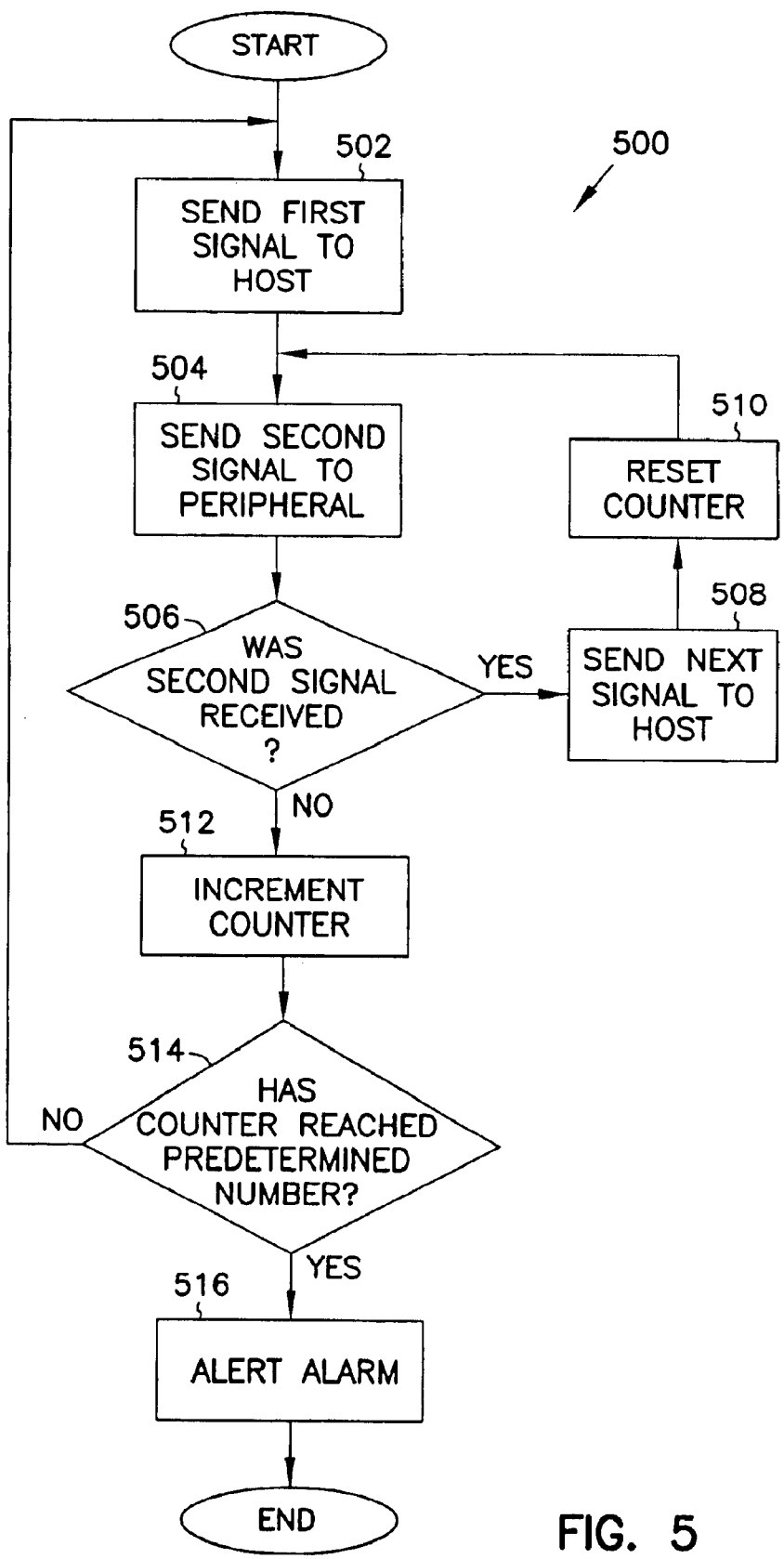
FIG. 5 is a flow chart diagram of one embodiment of the present invention.

In one embodiment, the present invention comprises a method for wireless communication between a host device and a peripheral device. In one embodiment, the method is a computer based method for wireless communication between a host computer and a first peripheral device. As shown in FIG. 5, the method 500 comprises sending a first signal 502 to the host device from the first peripheral device. A second signal is sent to the peripheral device from the host device is 504. The second signal confirms receipt of the first signal by the host device within a preselected time period following transmission thereof.

What follows depends on whether the second signal is received, as shown in decision block 506. If the second signal is received, the next signal is sent (508) from the first peripheral device to the host device. If the second signal is not received within the preselected time period, a counter is incremented in block 512, and if the counter has not reached a predetermined number as determined at decision block 514, the first signal is resent in block 502. If the second signal is not received after a predetermined number of times the first signal has been resent, the counter will be incremented to the predetermined number, and at decision block 514, process flow is directed to block 516, wherein an alarm is alerted. After transmission and successful receipt of the second signal, the next signal is sent to the host in block 508, and the counter is reset in block 510. Process flow continues with block 502.

In conclusion, the present invention in one embodiment comprises a system for notifying a user of a loss of wireless communication, the system comprising a host device and at least one peripheral device connected to the host device by a wireless connection. The system further comprises means for detecting a loss of wireless connection between the host device and the at least one peripheral device and means for notifying the user of the loss of wireless connection between the host device and the at least one peripheral device. The wireless connection may be an IR or RF connection.

The host device may be a host computer and the at least one peripheral device may comprise a computer keyboard. The keyboard may further comprise an input device through which multiple peripheral devices may communicate with the host computer. The peripheral device may be a remote control device. The system may comprise multiple peripheral devices which the host device is capable of identifying and distinguishing from one another.

Notifying the user of the loss of wireless connection between the host device and the at least one peripheral device comprises an audible alarm or a vibrating alarm. The audible alarm may further comprise a series of beeps, which may increase in volume over time until the alarm is shut off by the user. Where multiple peripheral devices are present, an alarm specific to each may signify a loss of communication with the host device.

In another embodiment, the present invention comprises a computer based method for wireless communication between a host computer and a first peripheral device, said host computer including a receiver for receiving data in the form of electromagnetic signals from said peripheral device and said first peripheral including a receiver for receiving data in the form of electromagnetic signals from said host computer. The method comprises sending a first electromagnetic signal from the first peripheral device to the host computer, wherein the host computer recognizes the first peripheral as the source of said first electromagnetic signal and sends a second electromagnetic signal from the host computer to the first peripheral device confirming the receipt of the first electromagnetic signal by the host computer within a preselected time period following transmission thereof. When the first peripheral device recognizes the second electromagnetic signal from the host computer confirming receipt of the first signal by the host, the first peripheral device sends a third electromagnetic signal to the host computer and awaits confirmation thereof. When the first peripheral device fails to receive the second electromagnetic signal from the host computer, the first peripheral device retransmits the first electromagnetic signal a preselected number of times. After the first peripheral has retransmitted the first electromagnetic signal a preselected number of times with no confirmation of receipt thereof, an alarm signal is sent to notify a user that the communication between the host computer and the first peripheral has been lost.

In a further embodiment, the present invention comprises a method for notifying a user of a loss of wireless communication between a host device and at least one peripheral device, the method comprising detecting a loss of wireless communication between a host device and at least one peripheral device, signaling software controlling a transceiver that the loss of communication has been detected and transmitting a message to alert the user of the loss of wireless communication.

In a still further embodiment, the present invention comprises a computer-readable medium having computer-executable instructions for performing the method of detecting a loss of wireless communication between a host device and at least one peripheral device, signaling software controlling a transceiver that the loss of communication has been detected and transmitting a message concerning the loss of communication.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the following claims, and the full scope of equivalents thereof.

What is claimed is:

1. A system for notifying a user of a loss of wireless communication, the system comprising:
   a host device;
   at least one peripheral device connected to the host device by a wireless connection, the at least one peripheral device being capable of sending a first signal to the host device, and the host device being capable of sending a second signal to the at least one peripheral device in response to, and verifying receipt by the host device of, the first signal sent by the at least one peripheral device;
   wherein the at least one peripheral device is also capable (a) of recognizing that the second signal from the host device has not been received after the sending of the first signal and (b) of then resending the first signal a preselected number of times so long as no second signal is received after each resending of the first signal; and
   an alarm responsive to a determination that the second signal has not been received by the at least one peripheral device after the resending of the first signal the predetermined number of times, the alarm notifying the user of the loss of wireless connection between the host device and the at least one peripheral device;
   wherein the alarm is configured as part of said at least one peripheral device.

2. The system of claim 1 wherein the host device is a host computer and the at least one peripheral device is a computer keyboard.

3. The system of claim 2 wherein the keyboard comprises an input device through which multiple peripheral devices may communicate with the host computer.

4. The system of claim 1 wherein the wireless connection is an IR connection.

5. The system of claim 1 wherein the wireless connection is an RF connection.

6. The system of claim 1 wherein the at least one peripheral device is a remote control device.

7. The system of claim 1 wherein the alarm is an audible alarm.

8. The system of claim 7 wherein the audible alarm comprises a series of beeps.

9. The system of claim 8 wherein the series of beeps increases in volume over time, until the alarm is shut off by the user.

10. The system of claim 1 wherein the alarm comprises a vibrating alarm.

11. The system of claim 1 wherein:
the at least one peripheral device comprises a first peripheral device and at least one additional peripheral device; and
the host device is capable of identifying and distinguishing between the first peripheral device and the at least one additional peripheral device.

12. The system of claim 11 wherein the alarm comprises a first alarm specific to the first peripheral device and a second alarm specific to the at least one additional peripheral device.

13. The system of claim 1 further comprising:
an input device included as part of the least one peripheral device for communicating with the host computer;
wherein the at least one peripheral device is configured to control the host device according to inputs received from the user via the input device.

14. A computer based method for wireless communication between a host computer and a first peripheral device, said host computer including a receiver for receiving data in the form of signals from said first peripheral device and said first peripheral device including a receiver for receiving data in the form of signals from said host computer, the method comprising:
sending a first signal from the first peripheral device to the host computer, wherein the host computer recognizes the first peripheral as the source of said first signal;
sending a second signal from the host computer to the first peripheral device confirming the receipt of the first signal by the host computer within a preselected time period following transmission thereof;
wherein when said first peripheral device recognizes the second signal from the host computer confirming receipt of the first signal by the host, the first peripheral device sends a third signal to the host computer and awaits confirmation thereof, and wherein when the first peripheral device fails to receive the second signal from the host computer, the first peripheral device retransmits the first signal a preselected number of times; and
initiating an alarm signal notifying a user that the communication between the host computer and first peripheral has been lost after the first peripheral has sent the first signal a preselected number of times with no confirmation thereof.

15. The method of claim 14 wherein the first and second signals are electromagnetic signals.

16. The method of claim 14, wherein the alarm signal is initiated from said first peripheral device.

17. The method of claim 14 wherein the first peripheral device is configured to control the host computer in accordance with inputs received from the user via a the first peripheral device.

18. A method for wireless communication between a host device and a first peripheral device, said host device including a receiver for receiving in the form of signals from said first peripheral device and said first peripheral device including a receiver for receiving data in the form of signals from said host device, the method comprising:
sending, a first signal from the first peripheral device to the host device, wherein the host device recognizes the first peripheral as the source of said first signal;
sending a second signal from the host device to the first peripheral device confirming the receipt of the first signal by the host device within a preselected time period following transmission thereof
wherein when said first peripheral device recognizes the second signal from the host device confirming receipt of the first signal by the host device, the first peripheral device sends a third signal to the host device and awaits confirmation thereof, and wherein when the first peripheral device fails to receive the second signal from the host device, the first peripheral device retransmits the first signal a preselected number of times and
initiating an alarm signal notifying a user that the communication between the host device and first peripheral has been lost after the first peripheral has sent the first signal a preselected number of times with no confirmation thereof.

19. The method of claim 18 wherein the first and second signals are electromagnetic signals.

20. The method of claim 18 wherein the first peripheral device is configured to control the host device according, to inputs received from the user via the first peripheral device.

21. The method of claim 18 wherein the host device is a television and the first peripheral is a remote control associated with said television.

22. A system for notifying a user of a loss of wireless communication, the system comprising:
a host device;
at least one peripheral device connected to the host device by a wireless connection, the at least one peripheral device being capable of sending a first signal to the host device, and the host device being capable of sending a second signal to the at least one peripheral device in response to, and verifying receipt by the host device of, the first signal sent by the at least one peripheral device;
an alarm responsive to a determination that the second signal has not been received by the at least one peripheral device, the alarm notifying the user of the loss of wireless connection between the host device and the at least one peripheral device;
wherein the alarm is configured as part of said at least one peripheral device; and
wherein the alarm is audible and comprises a series of beeps increasing in volume over time until the alarm is shut off by the user.

* * * * *